March 1, 1966 R. G. MILLHISER 3,237,351
METHOD FOR HANDLING GRIT
Filed June 15, 1961 2 Sheets-Sheet 1
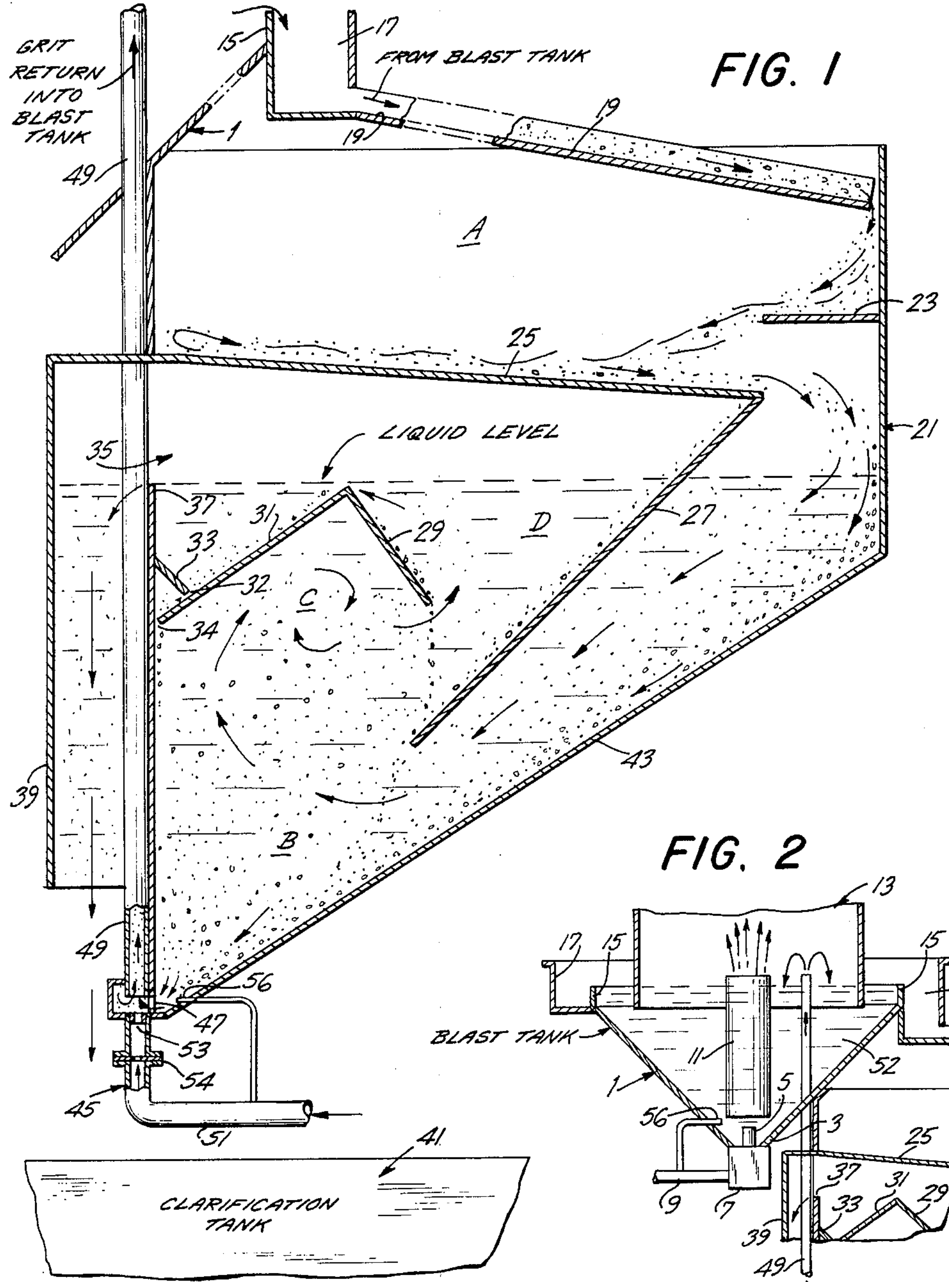
INVENTOR.
ROBERT G. MILLHISER
BY
Curtis, Morris & Safford
ATTORNEYS METHOD FOR HANDLING GRIT
Filed June 15, 1961 2 Sheets-Sheet 2
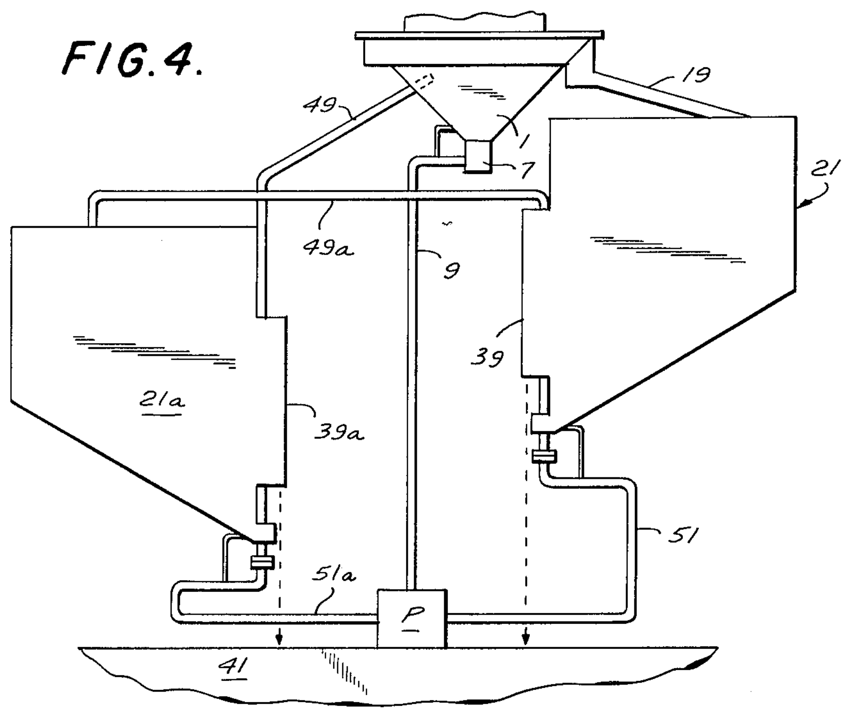
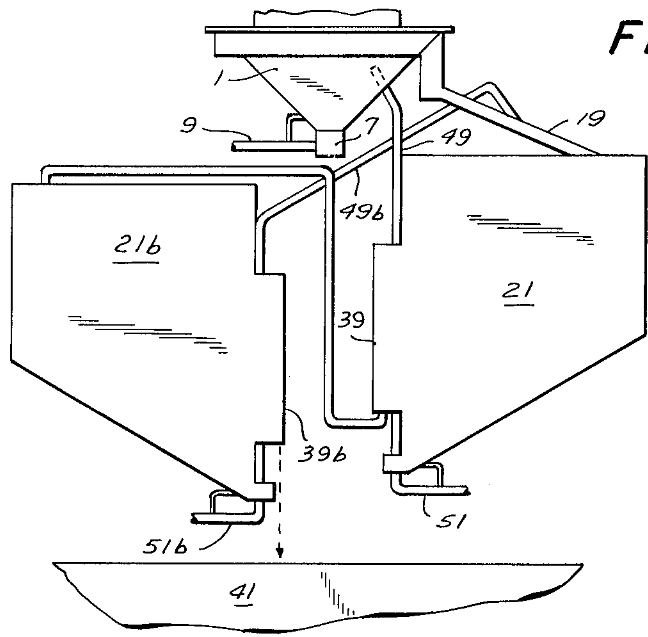
INVENTOR
ROBERT G. MILLHISER
BY
Curtis, Morris & Safford
ATTORNEYS 3,237,351
Patented Mar. 1, 1966

3,237,351
METHOD FOR HANDLING GRIT

Robert G. Millhiser, Detroit, Mich., assignor to Ajem Laboratories, Inc., Livonia, Mich.

Filed June 15, 1961, Ser. No. 117,444
4 Claims. (Cl. 51—320)

This invention relates to new and improved method and apparatus for handling grit mixed with liquid and for separating clarified liquid from suspensions and transporting concentrated solids in liquid suspension.

This invention is particularly adapted for use in apparatus of the type wherein a surface treatment of articles is effected by impingement with suspensions of abrasive in liquid. This impingement process is particularly adapted for surface reforming by a scouring, abrading, deburring, descaling or other similar process. Such process, and an apparatus of this general type, is fully described in the copending patent application of E. Umbricht et al. U.S. Serial No. 9,910, filed on February 19, 1960.

As described in the above-identified patent application, surface treating particles entrained in jet-like liquid streams are impinged upon an article with sufficient energy to reform its surface. The article to be treated was supported within a chamber to confine and gather all splatter and drain-back into a conical hopper or sump system. The sump served as (1) a reservoir for grit and suspending liquid and also as (2) a continuous hydraulic concentrator and reconditioner for the used grit and clarified for the liquid. Deteriorated grit and dirt were carried by excess liquid so as to flow over a weir edge; the remaining grit which is still satisfactory for reuse is less-readily suspended and settles within the sump to a point at which it can be picked up by high speed liquid jets, as fully described therein.

This invention provides a method and apparatus for effectively handling grit suspended in liquid. Among the many advantages of the illustrative embodiment of the present invention are the prevention of excessive loss of reusable abrasive material and improved efficiency in entrapping, retaining and removing from the liquid the reusable grit particles which are above a predetermined size. This invention is particularly directed to new and improved apparatus and method for recovery and transport of grit and clarified liquid with high efficiency.

These and numerous other objects and advantages are achieved in accordance with this invention by an entrapment chamber for a liquid suspension in which particulate matter is collected which, for example, may be overflow from the sump of a washer or abrasive blasting system. The chamber includes a number of baffles which direct the liquid suspension along a tortuous flow path to the weir edge over which it escapes.

The abrupt changes in flow direction to which the liquid suspension is subjected induce particulate matter of suitable size to settle out into a funnel-shaped base of the entrapping chamber; particulate matter which remains in suspension is washed over the weir edge. The liquid overflowing the weir passes into a clarification tank where the finer solid particles are separated and a clarified liquid recovered for reuse in the apparatus.

The funnel-shaped base of the entrapping chamber communicates through an orifice with a slurry conveyor system which returns the particulate matter to the apparatus where it will be reused.

In this specification and the accompanying drawings, I have shown and described a preferred embodiment of this invention. It is to be understood, however, that this is not intended to be exhaustive of the various applications to which this invention is susceptible, and that numerous changes and modifications which will occur to persons skilled in the art, to best suit the conditions of a particular use will be made without departing from the spirit and scope of this invention.

In the drawings:

FIGURE 1 is a vertical axial sectional view of an entrapment chamber with feed and return passages in accordance with this invention. The trough 17 and adjacent parts are displaced downward to correct the misalignment which otherwise would result from breaking away a portion of trough 19.

FIGURE 2 is a schematic view in vertical axial section showing the relation of an entrapment chamber such as that of FIGURE 1 to a slurry blasting apparatus of the type described in the above-identified Umbricht patent.

FIGURE 3 is a diagrammatic top plan view of a tandem, or series, arrangement of entrapment chambers of the type shown in FIGURE 1 with a slurry blasting apparatus.

FIGURE 4 is a schematic elevational view of cascade apparatus according to the present invention for reclaiming grit.

FIGURE 5 is a schematic elevational view of an apparatus intended for counter-current washing and reclamation of grit.

The apparatus illustrated in FIGURE 2 comprises a hopper-like sump 1 containing a liquid suspension of surface treating particles. The treating particles gravitate downward along the sloped sides and toward the apex 3 of the sump where they are entrained in a high velocity, jet stream of liquid forcefully ejected from a nozzle 5. The nozzle 5 is positioned on, and communicates with, a pressure manifold 7 into which liquid under pressure is supplied from a liquid conduit system 9.

Spaced slightly above the nozzle 5 and extending substantially to, and advantageously above, the liquid level is a blast tube 11. This tube 11 together with the jet nozzle 5 constitutes an eductor jet in which the treating particles are entrained. This jet-like blast passes up through the tube 11 to the top of the liquid in the sump 1 and is selectively directed to impinge upon the surface of an article to be treated.

The article to be treated is supported above the blast tube 11 within a hood-like chamber 13. This chamber confines all the liquid and treating particles as well as the dirt and other particulate matter removed from the surface of the article and guides it back into the sump 1.

During the treating process, the treating particles, herein referred to as "grit" whether abrasive particles or steel shot or other treating particles, are projected with violent impacts against the surface of the article. As the treating process continues, therefore, the individual particles are subject to wear and/or fracture and small particles of the surface or adherent thereto are knocked off. Accordingly, it is desirable to continuously classify and separate the good treating particles of the grit from dirt and broken, or worn-out particles.

The drain-back material received in the sump 1 includes excess liquid, which overflows along the weir edge 15 carrying with it dirt and waste material and as well as some of the finer grit particles, while the coarser and heavier particles fall through the liquid to the apex region 3 where they are again entrained in the blast.

The overflow falling from the weir 15 runs along troughs 17 and 19 into the second separation tank or "entrapment chamber" 21.

A substantial quantity of suitable treating particles are carried in the overflow liquid delivered by the trough 19.

The entrapment chamber of FIGURE 1, although disclosed here as a part of a wet grit blasting system, is valuable as a device for concentrating suspended solids and for clarifying liquids, whether employed singly or in combination with a sump or wet blast system as shown in FIGURE 2 or in tandem as shown in FIGURE 3.

The trough 17 is sloped toward the trough 19 so that the overflow liquid and its suspended matter from the sump 1 flows by gravity along trough 17 and along a sloping trough 19 which extends across and into the entrapping chamber 21. The entrapping chamber 21 is shown beneath and to one side of the blast tank 1. However, it may be remotely located with respect to the sump and the overflow liquid may be directed into the sump along a conduit or pipe system.

As shown in FIGURES 1 and 3, the entrapping chamber 21 is substantially rectangular in plan, and includes a number of baffle structures 23 through 33 arranged as shown and extending along its entire length.

These baffle structures 23 through 33 are selectively positioned and relatively disposed along the altitude of chamber 21 to provide a confined, tortuous flow path through the chamber 21 to an escape vent 35 having a weir edge 37. The escape vent 35 is effectively isolated from the point of introduction of the liquid suspension except for the tortuous path defined by the baffle structures 23 through 33. Accordingly, the bulk flow of the liquid suspension is forced along this tortuous path, as indicated by the arrows, and creates excess head of liquid along the weir edge 37, which consequently overflows and falls at pipe 39 into a clarification tank 41 (shown broken away in FIGURE 1).

The liquid suspension flowing from the inclined chute 19 is deflected downward by the side wall of chamber 21 and then inward by baffle 23, and flows laterally across the tank 21 above the baffle 25. As it nears the opposite wall in the area A turbulence occurs, helping to break-up random distribution of the particles in the flow. From area A, the liquid suspension flows back along the top of baffle 25 and thence downwardly between the baffle 27 and inclined base 43 of the chamber 21 toward the settling area B. As the liquid is forced to make a substantial reversal of flow at the juncture of baffles 25 and 27, the heavier particles tend to be carried on by their inertia so as to overshoot against, and down along, the chamber wall.

At the settling area B, the flow of the liquid is again subjected to an abrupt change in direction. During this downward flow, however, the heavier particles have acquired a momentum which induces them to continue downwardly through the settling area B; the lighter and smaller particles more unsuitable for use as grit are carried along in the flow and upward into the area C.

At the area C, the bulk flow is deflected upward (as indicated by the arrows), into the inverted V-structure comprising baffles 29 and 31. On this third abrupt reversal of flow direction, the momentum of the treating particles carries them on toward the vertical wall where they gravitate downward into the collecting area B, while the liquid with the lighter particles, having acquired less momentum, is carried along the indicated lines of flow around the lower sides of the baffles 31 and 29 to the bottom edge where it suffers another sharp reversal of flow and eventually passes on into the area D.

As the liquid rises in the area D, the width increases and the linear velocity accordingly decreases, so that any heavier particles still suspended in the liquid again gravitate toward the upper surfaces of baffles 27 and 29 and along them into the collecting area B.

Even beyond the ridge of baffles 29–31, the heavier and less readily-suspendible particles tend to settle toward the baffle 31 and therefore before the liquid reaches the vertical wall such particles have settled to a level substantially below the weir edge 37; and more-readily suspendible solids, however, are carried along in the flow over the weir edge 37. Those treating particles which do not escape over the weir edge continue to settle along the upper surfaces of baffles 33 and 31 and gravitate through a narrow gap 32 between them and then through the narrow spacing 34 and along the inner wall of chamber 21 to the settling area B. The spaces 32 and 34, both because of their location in "pockets" away from the main lines of flow and because of their narrow openings, do not have substantial upward flow to interfere with such settling.

It is to be noted also that disturbance of the surface liquid along the weir edge 37 is virtually eliminated by the agencies of baffles 29, 31 and 33. The baffle 29, described above, provides that the bulk flow is introduced to area D at a depth substantially below the weir level of the chamber 21. Moreover, as explained above, the baffles 31 and 33 prevent an upward flow of the liquid suspension near the inner wall of chamber 21. Accordingly, a very effective cleaning and classification of treating particles is effected whereby only unwanted particles are in the liquid which overflows the weir edge 37, and substantially all of the dirt and unwanted particles are returned with the excess liquid to the clarification tank 41.

The entrapment chamber 21, therefore, concentrates and collects in its area B the particles suitable for reuse in treating processes. However, for such particles to again enter into the treating process, it is requisite that they be transferred to sump system 1 of FIGURE 2.

This return of reclaimed treating particles to the sump system 1 is achieved by an elevator tube 45. If the height of the lift is not too far above the liquid level in the tank 21, this may be accomplished by aerating the slurry in the pipe enough to reduce its average density so that it will be pushed up by the weight of liquid in tank 21. If the required lift is higher it can be accomplished by the dynamic effect of a high velocity fluid jet; and if the fluid is compressed air or other gas it can combine the static head effect of reduced density with the dynamic jet effects.

In accordance with another aspect of this invention the elevating may be by a liquid conduit 49 extending from the apex at the bottom of the settling area B of chamber 21 vertically upward into the sump 1 (see FIGURE 2). Another pipe 51 supplies fluid under pressure from a pump P (see FIGURE 3) which advantageously draws liquid from the clarification tank 41 (see FIGURE 1) and sends this clarified liquid through the pipe 51 and then up through a jet orifice 53 centered below the open end of the grit-return conduit 49. This jet entrains the grit slurry gravitating in through orifice 47 and drives it upwardly along the conduit 49. The pressure in pipe 51 and the form and dimensions of the orifice 53 are such as to maintain a moderate flow velocity in the conduit 49, which will minimize abrasion in this conduit.

Although this grit-return conduit 49 for returning the grit into the blast tank is here shown by way of example as being in the form of an upright elevator pipe, it is to be noted that this conduit 49 often is inclined or bent or includes one or more sections of rubber hose arranged in sweeping bends as may be convenient for conducting the grit back from the entrapment chamber 21 into the sump 1, depending upon the position of the entrapment chamber 21 in the various installations. In this illustrative example, the entrapment chamber 21 is shown as being closely adjacent to the sump 1, which latter is often called the blast tank. However, as will be understood, there are instances wherein the entrapment chamber 21 is positioned more remotely from the blast tank 1, and then the grit-return conduit 49 follows a path varied from that as shown in FIGURES 1 and 2. It is an advantage of this invention that a substantial quantity of grit per unit time can be returned to the blast tank 1 with a relatively limited amount of fluid flow passing through the jet orifice 53, and the grit-return conduit 49 can be directed along whatever path is most suitable for each particular installation.

In order to control the flow of fluid for elevating the grit, flow control means, for example, such as a flow control valve or orifice 54 may be provided, as shown, to reduce the pressure behind the jet orifice 53 and thus reduce the velocity of flow induced thereby in pipe 49.

It has been found that treating particles entrapped in chamber 21 may be transferred along the conveyor system 45, 49 to the sump system 1 at a very acceptable rate. This transfer, if desired, may be effected concurrently with a treating process as the quantity of liquid used in jet 53 for returning the grit is relatively small compared to the capacity of the sump 1. The grit being returned to the sump 1 can be discharged by the return conduit 49 at any convenient point within the sump 1. However, it is preferable to return this grit to a point such that it is discharged above the level of the liquid 52 in the sump 1 so as to avoid the back pressure and discharge impediment at the discharge end of the conduit 49 which would be present if this conduit terminated below the liquid level. In this way, a relatively large flow of returning grit is maintained moving upwardly through the conduit 49 by means of a relatively small flow of propelling fluid through the jet orifice 53.

It should be evident to those skilled in the art from the description hereinabove set forth that this invention is susceptible to various modifications without departing from its spirit and scope. For example, while the chamber 21 has been described as being substantially rectangular, it may be circular with the baffle structures 23 through 33 supported therein each of truncated, conical configuration with the drain conduit 39 at its center, the elevator pipe 49 going up through the control conduit and the settling tank and baffles annular so that a radial section on any radius is essentially as shown in FIGURE 1. Thus it provides a confined, tortuous flow path for the liquid suspension as described above.

A number of the entrapping chambers 21 may be stacked one above the other in cascade FIGURE 4, or arranged, one after another, in tandem for countercurrent washing of the grit, for example, as shown in FIGURES 3 and 5; so that excess liquid overflowing the respective weir edges 37 and falling along the respective conduit section 39 of one chamber 21 is received as liquid suspension within the next chamber **21*b* to be clarified and the particles collected in the bottom of one tank 21*b* are elevated into the previous tank 21 through a conduit 49*b*, until from the first tank 21 the settled grit is elevated into the blast tank through conduit 49. In such instance, the settling areas B of each of the chambers communicate with the liquid conveyor system through respective orifices 47**.

With such a series of tanks a better washing and classification can be effected. In each tank the grit settles to the bottom while dirt and small fragments or worn particles of grit are carried off by the liquid, overflowing the weir. In the transfer conduit **49*a* and in the next tank 21*a* of the apparatus shown in FIGURE 4, the grit is again mixed with clean liquid and is again settled, while removing dirt and finer particles, which are carried off over the weir. The liquid thus overflowing may be discarded or it may be run to a settling tank 41 and/or filters until it is sufficiently clean for reuse. The cleaning of the settled grit and keeping it fluid, so as to run easily into the intake openings of the ejector tubes 11 and 49, can be facilitated by providing small, continuous jets 56 (shown in FIGS. 1, 2 and 3) near the bottom of the collecting area and aimed through the mass of collected particles toward the respective grit intake openings, for example the opening 47. These small continuous booster jets 56** assure a continuous feed of the grit particles into the desired stream of fluid.

I claim:

1. The method of reclaiming used grit from a wet blasting operation which comprises settling the grit in a fluid body with excess liquid, overflowing the excess liquid with the lighter solids and other wastes being carried along in suspension therein, entraining the settled grit by a jet of clean liquid and flowing the resulting stream through a conduit to another liquid body, settling the grit therein, and overflowing excess liquid along with fine solids and other wastes, again entraining settled grit by a jet of clean liquid and flowing through a conduit for reuse, the excess liquid overflow being cleaned of suspended solids and pumped back to form said jets.

2. The method of reclaiming used grit from a wet blasting operation which comprises settling the grit in a fluid body with excess liquid in a confined space which narrows gradually towards its bottom so that the settled grit is confined eventually in a relatively small area, and supplying a slow infiltration of clean water in said area to give a final cleaning to said grit and to keep it from concentration by settling beyond the point of fluidity, overflowing the excess liquid with the lighter solids and other wastes being carried along in suspension therein, entraining the settled grit by a jet of clean liquid and flowing the resulting stream through a conduit to another liquid body, settling the grit therein, and overflowing excess liquid along with fine solids and other wastes, again entraining settled grit by a jet of clean liquid and flowing through a conduit for reuse.

3. The method of reclaiming used grit from a wet blasting operation which comprises settling the grit in a first fluid body with excess liquid, entraining the settled grit by a jet of clean liquid and flowing the resulting concentrated suspension back to said wet blasting operation for reuse therein, overflowing the excess liquid with the lighter solids and other wastes being carried along in suspension therein, adding the overflow from the first fluid body of liquid suspension to a second liquid body with excess liquid and settling more suspended grit out from said first overflow in said second body and overflowing the excess liquid of said second body along with fine solids and other wastes, entraining the settled grit from said second body by a jet of clean liquid and flowing the resulting stream through a conduit as a concentrated suspension back to said first body for settling therein.

4. The method of reclaiming used grit from a wet blasting operation which comprises settling the grit in a fluid body with excess liquid, overflowing the excess liquid so that the lighter solids and other wastes are carried along in suspension therein, entraining the settled grit by an elevator jet of substantially clean liquid, flowing the resulting stream through a conduit for reuse, cleaning a substantial portion of the overflow liquid of suspended solids and using the resulting cleaned liquid in forming said elevator jets.

References Cited by the Examiner

UNITED STATES PATENTS

| | | | |
|---|---|---|---|
| Re. 23,064 | 12/1948 | Tirrell | 51—8 |
| 762,309 | 6/1904 | Hoffman et al. | 209—155 |
| 805,029 | 11/1905 | Reichhelm. | |
| 819,922 | 5/1906 | Radell | 51—10 |
| 1,021,009 | 3/1912 | Speer | 209—155 |
| 2,426,072 | 8/1947 | Wall et al. | 51—320 |
| 2,516,222 | 7/1950 | Lindmark | 51—320 |
| 2,613,482 | 10/1952 | Hamacher | 51—8 |
| 2,770,924 | 11/1956 | Mead et al. | 51—8 |
| 2,955,387 | 10/1960 | Soderman | 51—8 |
| 2,995,873 | 8/1961 | Ackerman | 51—8 |

FOREIGN PATENTS

| | | |
|---|---|---|
| 535,287 | 10/1931 | Germany. |
| 15,980 of 1884 | 12/1884 | Great Britain. |
| 15,723 of 1891 | 7/1892 | Great Britain. |

ROBERT C. RIORDON, *Primary Examiner.*

LESTER M. SWINGLE, J. SPENCER OVERHOLSER, JOHN C. CHRISTIE, *Examiners.*